Dec. 27, 1932.   B. P. FONDA   1,892,428
CYCLE CONTROL SYSTEM
Filed April 9, 1931
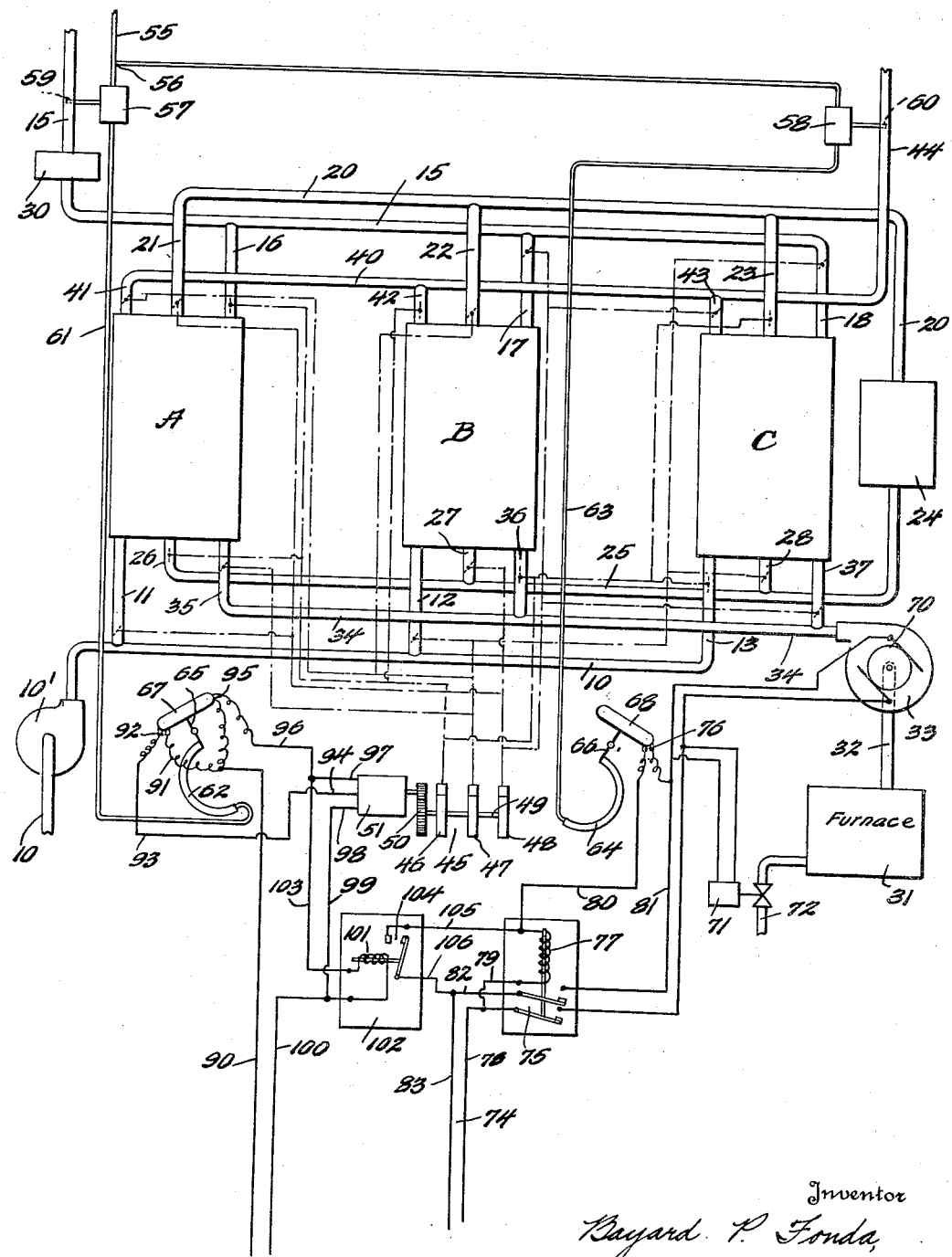
Inventor
Bayard P. Fonda,
By Watson, Coit, Morse & Grindle
Attorneys Patented Dec. 27, 1932

1,892,428

UNITED STATES PATENT OFFICE

BAYARD P. FONDA, OF BALTIMORE, MARYLAND, ASSIGNOR TO THE SILICA GEL CORPORATION, OF BALTIMORE, MARYLAND, A CORPORATION OF MARYLAND

CYCLE CONTROL SYSTEM

Application filed April 9, 1931. Serial No. 528,923.

This invention relates to a method of and apparatus for cycle control.

More particularly the invention includes the method of and apparatus for controlling the length of the various phases of a cycle including adsorption and activation.

It is a general object of the present invention to provide a novel and improved method of and apparatus for automatic cycle control.

An important feature of the invention resides in positively controlling the length of the adsorption phase of a cycle in accordance with the condition of the effluent treated medium from the adsorber.

Another important feature of the invention resides in the control of the heating or activating phase in accordance with the actual conditions of the effluent heating medium from the adsorber.

Another feature of the invention resides in the method of separating a gas or vapor from a mixture of gases and/or vapors which comprises a selective adsorption of one or more of the constituents by bringing the gaseous mixture into contact with a batch of suitable adsorbent and in automatically stopping the passage of the gas from contact with a particular batch of adsorbent when the effluent, stripped gas contains more than a predetermined quantity of the adsorbable constituent.

Another feature of the invention resides in the dehydration of atmospheric air by contact with a mass of adsorbent material and the automatic stoppage of the contacting when the dehydrated air contains a predetermined percentage of moisture.

Still another feature of the invention resides in the provision of a method of and means for activating an adsorbent by the passage of a heated fluid thereover together with the automatic stoppage of the flow of said fluid in accordance with a predetermined condition of the effluent fluid.

Another and important feature of the invention resides in the activation of a mass of adsorbent saturated with moisture removed from air by the passage of heated gases through or over the adsorbent together with automatic stoppage of the flow of said gases when the effluent gases from the mass reach a predetermined temperature.

Other and further features and objects of the invention will be more apparent to those skilled in the art upon a consideration of the accompanying drawing and following specification wherein is disclosed a single exemplary embodiment of the invention with the understanding, however, that such changes and variations may be made therein as fall within the scope of the appended claims without departing from the spirit of the invention.

In said drawing,

The single figure is a schematic and diagrammatic representation of apparatus for controlling the phase lengths in an adsorption cycle to the type described.

The present invention deals particularly with adsorption and activation phases of a cycle which includes contacting a mixture of gases and/or vapors with a mass of adsorbent material to selectively adsorb one or more constituents therefrom and thereafter treating the adsorbent material to drive off these constituents and to revivify the adsorbent for further use. Such cycles are practised in a large number of arts and for the purpose of simplicity are exemplified in the present description in a dehydration method and apparatus wherein moisture is removed from atmospheric air. It will be understood that this type of system and apparatus are disclosed merely for the purpose of convenience in setting forth the invention and are in no sense to be considered as limiting.

Where air of a certain degree of dryness is desired for various industrial purposes or, for instance, for conditioning air for human consumption in buildings, auditoriums, and the like it has been found highly satisfactory to dehydrate the normal atmospheric air by passing it over or through a mass or bed of a suitable adsorbent material, of which there are many. It is preferred in accordance with the present invention to use a material containing one or more activated hydrous oxide gels such as silica, germania, tungstia, titania, alumina, and the like. The term "activated hydrous oxide gels" designates nearly dehydrated gels, jellies, and/or gelatinous precipitates or mixtures of the same of any of the foregoing oxides. This adsorbent material has selective adsorption properties, and due to the differences in vapor pressures, adsorbs water vapors in preference to most fixed gases. Other adsorbent or adsorbent material could be used in the present invention but those of the above enumerated type are preferred.

If apparatus is designed to have a capacity such as to handle air of maximum humidity as occurring in nature and if such apparatus is provided with several beds of adsorbent materials which are operated successively while saturated beds are being activated then if, in accordance with the usual practise, fixed phases are used the adsorption phase for each mass of adsorbent must be so fixed in length that useful saturation will not be reached before the termination of this fixed period even with maximum humidity. This means then that when the atmospheric humidity is low the adsorbent material will not be used to its full extent and will not become approximately saturated.

If, following the adsorption phase there is an activation phase wherein the adsorbent material is heated to drive off the adsorbed water vapor and revivify the adsorbent for reuse, this period must be of such length as to drive out the maximum quantity of moisture which could be adsorbed under extreme conditions. If then this period is fixed or the same as the adsorption period it will be seen that a large quantity of heat will be wasted in the event that a fixed adsorption phase is used for air of low humidity.

The present invention overcomes the above difficulties by adjusting automatically the adsorption phase to substantially saturate the adsorbent material and then providing automatic termination of the activating phase in accordance with the condition of the effluent activating gases so that each phase is automatically controlled to get the maximum use from the adsorbent material and to minimize the consumption of fuel for activating.

Referring now to the drawing, the invention is disclosed in connection with an adsorption system using three adsorbers A, B, and C, each of conventional form and containing a suitable mass of adsorbent material which is interposed between the two ends of a casing in such a way that any gases entering from one end of the casing must pass through the bed of adsorbent material before they can discharge from the opposite end of the casing. Three adsorbers may be used so that two can be placed in series for adsorption to obtain a better "clean up" or removal of the moisture to a lower degree of saturation where this is desired. Under these conditions the third adsorber is being activated and, at the termination of the activation period, is connected in as the second of the two adsorbers on the adsorption phase, that adsorber having previously been at the "front" in the adsorption being transferred to the activation phase. The system may be operated with complete satisfaction using but two adsorbers as will be evident.

Suitable conduits and valves together with automatic control mechanism for the valves are schematically illustrated in the present drawing but for a more complete disclosure of the arrangement of the piping and valves together with a control for the valves reference may be had to a copending application of E. B. Miller, Serial No. 425,883 for adsorption system filed February 4, 1930.

In the present drawing the atmospheric air inlet duct is shown at 10 and extends along beside all three adsorbers having the connections at the lower ends thereof indicated at 11, 12, and 13, each of these branches being provided with a suitable damper. The dried air outlet duct is shown at 15 connected by the branches 16, 17 and 18 to the upper ends of the three adsorbers respectively and each provided with a damper.

An interstage air duct is shown at 20 and is connected with the tops of the three adsorbers by means of the branch pipes 21, 22, and 23 respectively, each suitably provided with a damper. This duct 20 leads to an intercooler 24 where air which has been discharged from the first adsorber on adsorption is cooled indirectly with water to remove the heat of adsorption. From the intercooler 24 the air is delivered to the interstage duct 25 connected by branch pipes 26, 27, and 28 to the lower ends of the adsorbers.

To trace the circuit of air with the adsorbers set for operation as shown it will be seen that the air enters the inlet 10 under the influence of the adsorption fan 10', passes along the duct 10, through the branch 13 and its open damper into the adsorber C, and then out through the branch 23 to the interstage duct 20 where the air is delivered to the intercooler 24 and then into the duct 25 through the branch 26 into the adsorber A from which it is discharged through the branch 16 to the dry air duct 15, passing then through an after cooler 30 if this is found necessary to reduce the temperature and remove the heat of adsorption gained in the second adsorber.

In the phase just described the adsorber C is the more highly saturated having, in a prior phase, been the second adsorber in the phase. When it becomes saturated it is transferred to the activation phase by a suitable shift of the dampers.

In the drawing the adsorber B is, however, shown as on activation and for this purpose a suitable fuel for instance gas or oil is burned in the furnace 31 and the heated products of combustion are discharged through the pipe 32 under the action of the activation fan 33 and delivered into the duct 34 connected by branch pipes 35, 36, and 37 to the lower ends of the three adsorbers respectively. Each branch pipe is provided with a damper. The activation discharge duct 40 is connected by the branches 41, 42, and 43 to the three adsorbers respectively and each branch is provided with a suitable damper. This duct 40 has an outlet 44 which may discharge into a suitable stack and is termed herein the activation outlet duct.

It will be seen that the heated gases flowing through the duct 34 enter through the open damper in the branch 36 and pass through the adsorber B to drive out the moisture in the adsorbent therein and are discharged through the branch 42 into the duct 40 and finally into the stack by the duct 44.

It will be appreciated that different arrangements of adsorbers and ducts may be provided and that the present invention is not at all limited to the use of the arrangement just described. Any number of adsorbers from two up may be used in order that continuous operation may be had by activating one while at least one other is adsorbing. The control of the dampers to shift the adsorbers from phase to phase is schematically represented herein by the dot and dash lines connecting the various dampers to the cam mechanism 45 which illustrates three cams 46, 47, and 48 mounted on a shaft 49 and driven through reduction gearing 50 by the motor 51. The cam 48 controls through any suitable mechanism one pair of dampers for each adsorber. For instance, in the adsorber A it controls the dampers in the branch pipes 11 and 21 and may thus be said to control this adsorber for first stage adsorption when it opens these valves. It likewise controls the valves in the sections 17 and 27 in the adsorber B and thus when it opens these valves puts this adsorber in the second stage of adsorption. The same cam controls the valves in the branch pipes 37 and 43 in the adsorber C and therefore controls the activation of this adsorber. Each of the other cams likewise controls one set of valves on each adsorber so that when the cams are given a sufficient amount of rotation so that the lobes thereon act on their followers the valves in all three adsorbers are simultaneously adjusted and one adsorber is always placed on activation and two on adsorption and these events follow in the proper sequence for each adsorber.

A source of compressed air is connected to the pipe 55 which branches at 56 and in each of the branches is a control valve 57 and 58 respectively. The control valve 57 is actuated by a responsive element 59 in the dry air outlet duct. Conveniently this element 59 is humidity controlled and may be a suitable humidistat which opens the valve 57 when a predetermined moisture content exists in the discharge air in the duct 15. The valve 58 is under control of a responsive element 60 in the activation outlet duct 44. Conveniently this element 60 is thermo-responsive and serves to open the valve 58 when the temperature in the duct 44 rises to a predetermined point.

The pipe 61 extending from the valve 57 is connected to a Bourdon tube 62 and the pipe 63 from the valve 58 is connected to a Bourdon tube 64. Each tube is connected to a lever pivoted respectively at 65 and 66 and on the opposite ends of these levers are mounted the mercury contact switches 67 and 68 respectively, that shown at 67 closing contacts when tipped in either direction and that at 68 only when tipped to the position shown in the drawing.

The activation fan 33 is driven by an electric motor 70 and this is connected in parallel to the electric valve 71 which controls the fuel flowing through the pipe 72 to the activation furnace 31. Both the valve and the motor are adapted to be energized from the high voltage power line 74 when the magnetic switch 75 is closed. The valve is of the type which automatically closes when the current is shut off and which opens to permit the flow of fuel when the current is turned on so that the furnace operates and the activation fan is put into motion.

The device operates in the following manner. As shown in the drawing the adsorber B is being activated and the adsorbers C and A are adsorbing. The apparatus is so designed that a completely saturated adsorbent bed can be activated in less time than it would take a bed to become saturated under a condition of maximum moisture load. This means that the adsorber B will become fully activated before the adsorber C is ready for activation.

As activation progresses less and less of the heat in the activating gases is used to drive off the moisture from the adsorbent material i. e. less is converted to latent heat and therefore the temperature in the activation exhaust duct gradually rises. When this temperature reaches a predetermined point where activation is substantially complete, say 250° F., the control element 60 opens the valve 58 and compressed air flows through the pipe 63 and partially straightens out the Bourdon tube 64 which tilts the mercury switch 68 from the position shown to one where the circuit is broken at the contacts 76. This deenergizes the holding coil 77 which has been maintaining the switch 75 closed so that the furnace could operate and the fan be driven. It will be seen that the coil 77 was energized from the main conductor 78, the branch 79, the coil 77, the conductor 80, the contacts 76, the conductor 81, the upper switch arm, the conductor 82, and the main line conductor 83. When the circuit is broken at the contact 76 the switch 75 automatically opens, the furnace is shut off, and the activation fan 33 is stopped and the adsorber B remains inactive except for what cooling it gets by natural radiation.

During this activation and for some time subsequent thereto the control element 59 in the dry air outlet maintains the valve 57 closed for with one substantially fresh adsorber A the humidity of the issuing air is low. This maintains the switch 67 in the position indicated so that it closes the circuit from the low voltage control line 90, through the conductor 91, contacts 92, conductor 93, to the terminal 94 of the motor 51.

The motor 51 is one of the well known "half revolution" motors i. e. it is that type of motor which when the circuit is closed between two of its three terminals makes a half revolution of the driven shaft and automatically stops itself by a self-contained switching mechanism. When the circuit is then closed between two other terminals it makes another half revolution and stops, opening the circuit. Therefore it will be seen that the motor 51 will be stationary after having rotated when the contacts 92 were first closed.

Dehydration in the adsorbers C and A continues after the activation phase has stopped and the efficiency of the two adsorbers in series is finally lowered to a point where the humidity of the air in the dried air outlet rises to a predetermined limit at which point the control 59 opens the valve 57 and the compressed air expands into the pipe 61 and straightens out the Bourdon tube 62, tipping the mercury switch 67 and breaking the contact at 92 at the low humidity side and closing it at 95 on the high humidity side. This through the wire 96 closes the circuit to the terminal 97 of the motor 51, the remaining terminal 98 being always energized through the wire 99 and the other side 100 of the low voltage control line. The motor turns its shaft 180° and at the same time the magnet 101 of the relay 102 is energized for it is connected in parallel to the terminals 97, 98 of the motor by means of the wires 99 and 103. The magnet 101 closes the contacts 104 which through the wires 105 and 106 connect the upper side of the holding magnet 77 to the conductor 83 of the high voltage supply line and since the lower side of this coil is connected by the wire 79 to the other conductor 78 of the supply line 74 the switch 75 is closed and the activation apparatus is put into operation.

When the shaft of the motor 51 turns 180° the control cams 46, 47, and 48 are rotated to their next position to operate the dampers in all of the branch pipes of all of the adsorbers in such a manner, as previously described, that the adsorber which was just adsorbing at the front of the two on that phase is placed in the activation phase and the adsorber which has just been activated is placed at the rear of the adsorption phase while the adsorber which was at the rear of the adsorption phase is shifted to the front.

This causes the relative humidity of the air in the outlet duct to be reduced and since the temperature in the activation exhaust duct has already fallen the valve 57 will close and the valve 58 will be closed. This valve 58 will have closed some time previously due to lack of heat in the activation outlet duct but this does not interfere with the sequence of operations for prior to closing of the contacts 95 the activation apparatus cannot be started by closing of the contacts 76. The contacts 76 must first be closed and then the contacts 95 closed to operate the relay 102 to place the holding coil 77 in its locked position.

When the valve 57 closes the switch 67 tips again to the low humidity position opening the relay contacts 104 and again closing contact to the geared motor 51 which turns a further 180°. It is to be noted here that 180° of rotation of the motor shaft does not impart that much rotation to the shaft 49 carrying the cams. This second rotation of the motor merely places the cams in position for proper movement for the next shift of adsorbers and has no direct action on the adsorber valves. This second rotation of the motor 51 may be termed a recycling thereof.

The apparatus has now assumed a condition similar to that originally described except that a different adsorber is activating and different ones are adsorbing. The cycle of control is now ready to be repeated as above described upon the completion of activation of the saturated adsorber which has just been placed on that phase.

The above apparatus and system provide for shifting any number of adsorber beds through their various phases in rotation and only at such time as one of the beds then in the adsorber circuit has reached its maximum usefulness. Such a system gives 100% economy even though the moisture content of the air to be dried varies widely. The economy lies in the fact that the length of the activation period remains approximately constant (if the furnace efficiency remains constant) and when activation is complete, the fuel and fan are stopped automatically and remain so until an adsorbing bed has reached its capacity under the particular conditions that prevail and becomes ready for activation.

In the above description a certain exemplary type of control has been used but it will be realized that there are other methods of operating on this same principle of controlling the length of the phases of a cycle by means of the condition of the effluent dried air stream and the effluent activating gas stream and it is the intent to have the claims of this application include any modification of the apparatus which is capable of carrying out the system herein described.

Having thus described the invention, what is claimed as new and desired to be secured by Letters Patent is:

1. The method of operating an adsorber comprising passing a mixture of gases, vapors or gases and vapors therethrough, adsorbing certain of said gases or vapors in the adsorbent in the adsorber detecting the presence in the effluent gases or vapors from said adsorber of more than a certain percentage of the adsorbable gases or vapors and automatically stopping the flow of said mixture through said adsorber by the detection of an excess percentage.

2. The method of operating a group of adsorbers comprising passing a mixture of gases, vapors or gases and vapors through one of said adsorbers, adsorbing certain constituents of said mixture in the adsorber detecting the presence in the effluent stripped mixture of a definite percentage of the adsorbable constituents and automatically transferring the mixture flow to another adsorber upon the detection of said percentage.

3. The method of operating a group of adsorbers comprising passing a mixture of gases, vapors or gases and vapors through one of said adsorbers, adsorbing certain constituents of said mixture in the adsorber, detecting the occurrence in the effluent stripped mixture of a definite percentage of the adsorbable constituents, automatically transferring the mixture flow to another adsorber when said percentage is reached and then automatically supplying the saturated adsorber with activating gases.

4. The method of operating a group of adsorbers comprising passing a mixture of gases, vapors or gases and vapors through one of said adsorbers, adsorbing certain constituents of said mixture in the adsorber, detecting a change in the quantity of adsorbable constituents in the effluent gases, automatically transferring the flow of mixture to another adsorber by said detection, simultaneously supplying activating gases to the saturated adsorber and subsequently stopping the flow of said activating gases under the control of the condition of the effluent gas.

5. The method of operating a group of adsorbers comprising passing a mixture of gases, vapors or gases and vapors through one of said adsorbers, adsorbing certain constituents of said mixture in the adsorber, detecting a change in the quantity of adsorbable constituents in the effluent gases, automatically transferring the flow of mixture to another adsorber by said detection, simultaneously supplying activating gases to the saturated adsorber subsequently stopping the flow of said activating gases under the control of the condition of the effluent gas and successively using each adsorber for adsorption and repeating the cycle automatically.

6. The method of operating a group of adsorbers comprising passing a mixture of gases, vapors or gases and vapors through a plurality of said adsorbers in succession and therein adsorbing certain constituents of said mixture, detecting an increase in the percentage of adsorbable constituents in the effluent stripped gases, removing one adsorber from the front of the series and inserting a fresh adsorber at the end of the series when said percentage exceeds a predetermined amount and activating the removed adsorber to condition it for reuse.

7. The method of operating a group of adsorbers comprising passing a mixture of gases, vapors or gases and vapors through a plurality of said adsorbers in succession and therein adsorbing certain constituents of said mixture, detecting an increase in the percentage of adsorbable constituents in the effluent stripped gases, removing one adsorber from the front of the series and inserting a fresh adsorber at the end of the series when said percentage exceeds a predetermined amount, passing heated gases through the removed adsorber, detecting an increase in the temperature of the effluent gases and shutting off the flow of heated gases when a predetermined temperature of effluent gases is reached.

8. In an adsorption system, in combination, an adsorber, means to pass a gaseous mixture therethrough, adsorbent material in said adsorber capable of adsorbing a constituent from said mixture, an outlet duct for stripped mixture, means in said duct responsive to a change in the quantity of said constituent in the stripped mixture and mechanism controlled by said means to shut off the flow of mixture to said adsorber.

9. In an adsorption system, in combination, an adsorber, means to pass a gaseous mixture therethrough, adsorbent material in said adsorber capable of adsorbing a constituent from said mixture, an outlet duct for stripped mixture, means in said duct responsive to a change in the quantity of said constituent in the stripped mixture, mechanism controlled by said means to shut off the flow of mixture to said adsorber, means to supply a heated gas, means actuated by said first mentioned means to deliver said gas to the adsorber upon cessation of the mixture flow, a duct for the effluent heating gas, means in said duct responsive to temperature changes therein and mechanism controlled by said temperature responsive means to shut off the said delivery means.

10. In an air conditioning system, in combination, a plurality of adsorbers, an effluent dried air duct, a humidistat therein, an activation exhaust duct, a thermostat therein, a duct for air to be treated, a duct for heated activation gases, dampers to selectively connect each adsorber between said air ducts or said activation ducts, means actuated by the humidistat to change the dampers to remove an adsorber from the air ducts and place it between the activation ducts when the humidity of the effluent air rises, and means under the control of said thermostat to shut off the flow of activation gases when the activation exhaust gases reach a predetermined temperature.

In testimony whereof I hereunto affix my signature.

BAYARD P. FONDA.